United States Patent
Hwang

(10) Patent No.: US 12,511,060 B2
(45) Date of Patent: Dec. 30, 2025

(54) COMPUTING SYSTEM AND TRANSPOSITION METHOD THEREFOR

(71) Applicant: REBELLIONS INC., Seongnam-si (KR)

(72) Inventor: Seok Joong Hwang, Seoul (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 18/641,623

(22) Filed: Apr. 22, 2024

(65) Prior Publication Data

US 2024/0272813 A1    Aug. 15, 2024

Related U.S. Application Data

(63) Continuation of application No. PCT/KR2022/013936, filed on Sep. 19, 2022.

(30) Foreign Application Priority Data

Oct. 28, 2021  (KR) .................. 10-2021-0146162

(51) Int. Cl.
G06F 3/00   (2006.01)
G06F 3/06   (2006.01)

(52) U.S. Cl.
CPC ......... *G06F 3/0629* (2013.01); *G06F 3/061* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 9,513,908 B2 * | 12/2016 | Ahmed | G06F 9/30043 |
| 2010/0017452 A1 * | 1/2010 | Lee | G06F 17/142 |
| | | | 708/404 |
| 2016/0224514 A1 | 8/2016 | Moudgill et al. | |
| 2018/0157970 A1 | 6/2018 | Henry et al. | |
| 2019/0198097 A1 * | 6/2019 | Kim | G11C 16/34 |
| 2020/0266830 A1 | 8/2020 | Kim | |
| 2020/0301994 A1 | 9/2020 | Dikici et al. | |
| 2021/0056000 A1 * | 2/2021 | Rostagni | G06F 11/0793 |
| 2021/0096823 A1 | 4/2021 | Li et al. | |
| 2021/0374210 A1 | 12/2021 | Gu et al. | |

(Continued)

FOREIGN PATENT DOCUMENTS

| | | |
|---|---|---|
| CN | 109885628 A | 6/2019 |
| KR | 10-2015-0008185 A | 1/2015 |
| KR | 101591583 B1 | 2/2016 |

(Continued)

OTHER PUBLICATIONS

Office Action for KR 10-2021-0146162 by Korean Intellectual Property Office dated Dec. 12, 2024.

(Continued)

*Primary Examiner* — Midys Rojas
(74) *Attorney, Agent, or Firm* — BROADVIEW IP LAW, PC

(57) ABSTRACT

A computing system and a transposition method therefor. One aspect of the present disclosure provides a computing system that variably determines an input/output unit of a memory depending on a processing unit or an output unit of a processor, and a transposition method for supporting same.

9 Claims, 4 Drawing Sheets

(56) References Cited

U.S. PATENT DOCUMENTS

2022/0350933 A1* 11/2022 Bono .................... G06F 21/79

FOREIGN PATENT DOCUMENTS

| KR | 2017-0110691 A | 10/2017 |
| KR | 10-2018-0062912 A | 6/2018 |
| KR | 10-2020-0060778 A | 6/2020 |
| KR | 2020-0070089 A | 6/2020 |
| KR | 20200099438 A | 8/2020 |
| WO | 2014/011746 A1 | 1/2014 |
| WO | 2018/175129 A1 | 9/2018 |

OTHER PUBLICATIONS

Korean Office Action for Application No. 10-2021-0146162 dated Apr. 19, 2024 with English translation (12 pages).
Notice of Allowance for KR 10-2021-0146162 by Korean Intellectual Property Office dated Aug. 11, 2025.

* cited by examiner

COMPUTING SYSTEM AND TRANSPOSITION METHOD THEREFOR

CROSS-REFERENCE TO RELATED APPLICATION

The present application is a continuation of International Application No. PCT/KR2022/013936, filed Sep. 9, 2022, which is based upon and claims priority to Korean Patent Application No. 10-2021-0146162, filed on Oct. 28, 2021 in Korea. The entire disclosure of the above application is incorporated herein by reference.

TECHNICAL FIELD

The present disclosure relates to a computing system and a transposition method therefor.

BACKGROUND

The content described in this section simply provides background information for the present embodiment and does not constitute the related art.

A current AI accelerator stores tensor data in a vector memory inside the accelerator and processes data input and output in parallel through vector processing in order to maximize a hardware area and power efficiency. The vector processing refers to a data processing scheme for simultaneously processing a plurality of pieces of data with one instruction. Examples of a parallel processing scheme for performing the vector processing include Single Instruction Multiple Data (SIMD) and systolic array.

In order for a vector processor to process K pieces of data in parallel, K tensor elements must be able to be input or output from the vector memory. In order to smoothly and efficiently supply and process such high-bandwidth data, the AI accelerator adopts a unique tensor memory layout and vector processing scheme. This tensor memory layout and vector processing scheme are closely related to a parallel tensor calculation scheme that the AI accelerator utilizes.

For example, a tensor processing unit (TPU) performs parallel processing using parallelism for a channel dimension of tensor data. A vector memory of the TPU is implemented to input or output 128 (K=128) consecutive channel dimensional data per entry, and supports the vector processor so that the vector processor processes 128 pieces of data in parallel. However, there is a problem that this scheme of storing and processing K pieces of consecutive channel data in one unit makes it difficult to efficiently use computing resources of the vector memory and the vector processor when a size of the channel dimension is not a multiple of K.

SUMMARY

One aspect of the present disclosure provides a computing system that variably determines an input/output unit of a memory depending on a processing unit or output unit of a processor, and a transposition method of performing data transposition based on this.

The problems to be solved by the present disclosure are not limited to the problems mentioned above, and other problems not mentioned can be clearly understood by those skilled in the art from the description below.

According to an aspect of the present disclosure, a computing system including a memory module configured to input or output data from a memory according to a memory entry determined based on a basic input/output unit; and a processor, wherein the basic input/output unit is variably controlled based on a basic processing unit in which the processor process data or a basic output unit in which the processor output data is provided.

According to an aspect of the present disclosure, the computing system further comprises a transposition module configured to transpose input data based on the basic processing unit.

According to an aspect of the present disclosure, a method of performing transposition in a device, including determining a basic input/output unit of a memory module to be R times (R is a natural number) a basic processing unit in which a processor processes data or a basic output unit; and sequentially receiving R pieces of data from the memory module or the processor, and performing R×R transposition for each a basic transposition unit, considering the basic processing unit or the basic output unit as the basic transposition unit is provided.

According to an aspect of the present disclosure, it is possible to efficiently use hardware of the computing system, including maximizing parallel data processing or minimizing a delay, by providing a variable computing system in which an input and output scheme for the memory is determined depending on the basic processing unit in which the processor processes data or the basic output unit in which data is output.

According to an aspect of the present disclosure, it is possible to efficiently support layout change for data input to or output from each piece of hardware, by transposing data flowing between the memory and the processor based on the basic processing unit or basic output unit in order to support such a variable computing system.

The effects of the present disclosure are not limited to the effects mentioned above, and other effects not mentioned may be clearly understood by those skilled in the art from the description below.

DETAILED DESCRIPTION

Figure 1:
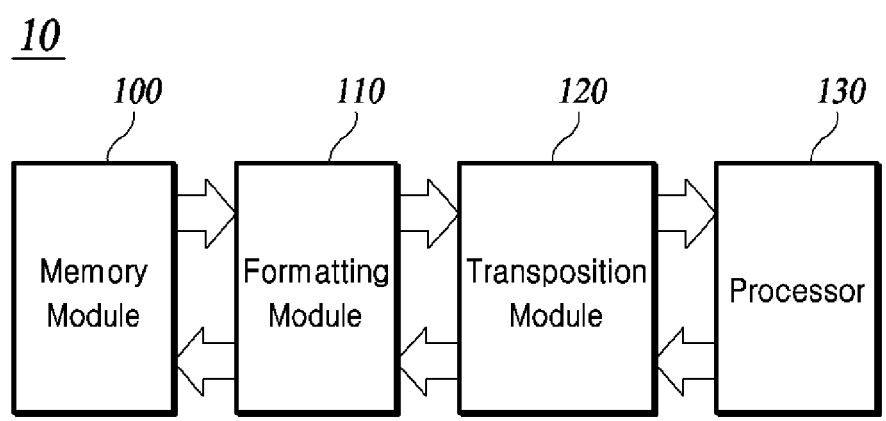
FIG. 1 is a block diagram showing a computing system according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'module', and the like refer to one or more units for processing at least one function or operation, which may be implemented by hardware, software, or a combination thereof.

The following detailed description, together with the accompanying drawings, is intended to describe exemplary embodiments of the present disclosure and is not intended to represent the only embodiments in which the present disclosure may be practiced.

In the present disclosure, feature map data of a tensor will be described as an example, but a computing system and a transposition method therefor are not necessarily limited to such use. For example, the computing system and the transposition method therefor proposed in the present disclosure can be extended and applied to weight data. Further, the present disclosure describes a 2D convolution scheme as a processing method, but this is an example, and the computing system and the transposition method therefor of the present disclosure can also be applied for various calculations such as high-dimensional (such as 3D) convolution and matrix multiplication.

FIG. 1 is a block diagram showing a computing system according to an embodiment of the present disclosure.

The computing system 10 according to an embodiment of the present disclosure includes all or some of a memory module 100, a formatting module 110, a transposition module 120, and a processor 130. The computing system 10 shown in FIG. 1 is a system according to an embodiment of the present disclosure, and not all components shown in FIG. 1 are essential components, and some components may be added, changed, or deleted in other embodiments. For example, in another embodiment, the computing system may include only the memory module 100 and the processor 130, and in another embodiment, the formatting module 110 may include an input formatting module (not shown) that formats data provided from the memory module 100, and/or an output formatting module (not shown) that formats data provided from the processor 130. In another embodiment, the transposition module 120 may include an input transposition module (not shown) that transposes the data provided from the memory module 100 and/or an output transposition module (not shown) that transposes the data provided from the processor 130.

FIG. 1 shows the formatting module 110 and the transposition module 120 as devices, but this is for convenience of description, and in another embodiment, the formatting module 110 and the transposition module 120 may be implemented as a software module or processor that performs a function of each of the components 110 and 120.

The memory module 100 functions to store data according to a variable memory layout (or memory array) and provide a memory to the processor 130. The memory module 100 may include a memory controller (not shown) that performs control for determining the memory layout, and a memory (not shown) that inputs and outputs (or stores and retrieves) data according to a memory layout that is preset or determined by the memory controller. Meanwhile, the memory may include an input/output module (I/O module (not shown)) and/or an in-memory computing (IMC) module. Functions and operations described hereinafter as operations of the memory module 100 may be performed by each component of the memory module 100.

The memory module 100 decomposes data and performs addressing. Decomposition, addressing, a determination of the layout of the memory entries, a determination of a formatting scheme, a determination of a transposition scheme, or the like may be performed depending on this decomposition scheme.

For example, the memory module 100 may decompose data according to one or more dimensions of a data type. Hereinafter, a tensor as a data format will be described as an example. When a tensor having a dimension (N×H×W×C) is received (or stored), the memory module 100 may decompose the dimensions of the tensor according to various domains. Here, N indicates a batch size, H indicates a height, W indicates a width, and C indicates the number of channels (hereinafter referred to as channel dimension). The memory module 100 may decompose an input tensor according to all or some of the batch dimension, height dimension, width dimension, and channel dimension. This decomposition makes it possible for the processor 130 of the present disclosure to make full use of parallelism of each of an input channel, an output pixel, and/or a batch in performing tensor calculation. Meanwhile, the tensor in the present disclosure is not necessarily composed of dimensions (N×H×W×C), and this is not considered as a parameter required for performing of the decomposition, the addressing, the determination of the layout of the memory entries, the determination of the formatting scheme, the determination of the transposition scheme, or the like for a dimension having a value of 1.

For example, when the memory module 100 decomposes the tensor in a channel dimension and a height dimension, the memory module 100 may decompose the tensor into N1, N0, H1, H0, W, C1, and C0 and perform addressing in the memory. In this case, the memory module 100 addresses the element(s) of the tensor in units of (N1, W, H0, C1), and the memory entry is determined in units of (N0×H1×C0) so that a maximum of (N0*H1*C0) elements can be input or output for each data input and output.

Here, C1=ceiling(C/C0), H1=ceiling(H/H0), N1=ceiling (N/N0). C0 is a basic input/output unit in which data is stored in the memory and input or output, that is, a size of the lane or row. Taking a tensor as an example, this is a size of the lane used to store elements of consecutive channels of each tensor. For example, when a tensor of (H×W×C)=(1× 1×4)=[A0, A1, A2, A3] is stored based on the memory layout of C0=2, the memory module 100 sequentially stores respective elements in Lane 0 and Lane 1 alternately. C0 can be determined based on K0, which is a size of a continuous channel dimension that the processor 130 can simultaneously process, and a determination scheme will be described in more detail below. N0 and H0 are values that are determined so that every C0 elements are all multiplied by the same weight when one unit of entry is output from memory depending on a size and stride of the convolution kernel under the condition that (N0×H1×C0) does not exceed K (a unit that the processor 130 can simultaneously process).

The memory module 100 determines the memory layout, or the like based on a basic processing unit/basic calculation unit of the processor 130, or a basic processing unit/basic calculation unit of the processor 130 related to a specific dimension (for example, channel dimension of a tensor) in relation to a data type of data (hereinafter collectively referred to as a basic processing unit). The memory module 100 may determine the basic input/output unit of the memory to be a multiple of the basic processing unit and determine the memory layout accordingly to address data. Here, the determination of the memory layout means a determination of the size of the lane. That is, the memory module 100 may determine the basic input/output unit to be a multiple of the basic processing unit of the processor 130 and determine the memory layout based on the basic input/output unit. The memory module 100 continuously stores consecutive elements of input data according to the data layout. The memory module 100 can decompose the dimensions of the data so that the data can be stored according to the data layout.

When this is applied to a tensor, the decomposition of the channel dimension and/or spatial dimension of the tensor is variably operated, but this operation may be performed by the memory module 100 determining the basic input/output unit C0 to be a multiple of K0, which is a basic processing unit of the processor 130 based on a channel dimension.

Meanwhile, the memory module 100 may similarly determine the layout of the memory entries according to the basic input/output unit in order to input or output data depending on the memory layout. For example, the memory entries may be determined based on the size of the lane. Accordingly, the memory module 100 and the processor 130 determine memory entries according to the basic processing unit of the processor 130, thereby enabling efficient parallel processing or parallel calculation. The artificial neural network typically has different data dimensions for each layer, and a calculation scheme and calculation unit may also vary for each layer. Accordingly, when the computing system 10 of the present disclosure is applied to an artificial neural network, the memory layout and the memory entry are determined for each layer and further according to the unit in which the processor 130 can process or calculate the layer, so that efficient memory input and output and processing become possible.

For example, in the above-described example, since a size of the memory entry is (N0×H1×C0), a value (or size) of C0 is variably operated so that the layout of the memory entries also becomes variable. The memory module 100 efficiently operates the memory input and output by increasing the value of C0 when a batch size (N0) of an input tensor of a specific layer of the processor 130 becomes small or a spatial dimension (H1) of the input tensor decreases. Since this is fixed, it is possible to efficiently use hardware resources even when a value of (N0×H1) becomes relatively small. In general, the input tensor of each layer tends to have a small channel dimension (C) when the spatial dimension (H×W) is large, and a large channel dimension when the spatial dimension is small. Accordingly, the computing system 10 of the present disclosure can maximize hardware efficiency by variably operating the value of C0 according to each layer of the artificial neural network.

Meanwhile, the data output from the memory module 100 must be transposed in order to convert the data decomposed and stored in the memory into an input to the processor 130 in consideration of the parallelism of the processor 130.

That is, the transposition module 120 receives R pieces of data in unis of memory entry from the memory module 100 and performs transposition. In this case, the memory module 100 sequentially outputs data with the alternate memory entries, and the transposition module 120 receives the alternatively output data and performs the transposition. Since the data input from the memory module 100 is data whose data dimension is decomposed to be R times the unit that the processor 130 can process, the R×R transposition must be performed on the data dimension and other data dimensions. The transposition module 120 may perform the R×R transposition considering consecutively located element(s) corresponding to the basic processing unit among elements included in the data in units of the memory entry as one transposition unit. In this case, the processor 130 processes R times the corresponding data dimensions in R divisions, thereby securing R times output parallelism.

For example, in the above-described example, since the tensor is decomposed based on the channel dimension, the transposition module 120 performs R×R transposition on the output tensor with respect to the spatial dimension and the channel dimension. The processor 130 can process the transposed tensor input with C0 (=K0*R) divided R times by using a method such as time-division multiplexing, and secure R times the parallelism of the output pixels.

Meanwhile, a specific limit may be set for R according to software/hardware constraints of the memory of the memory module 100, the processor 130, and other configurations. For example, R can be limited to be a power of 2. A specific operation of the transposition module 120 will be described later with reference to FIGS. 2 and 4.

Meanwhile, when a position of the output lane of the memory does not correspond to a position of the input lane of the processor 130, the computing system 10 may use the formatting module 110 to resolve lane mismatch. That is, in this case, data input to the processor 130 is data obtained by the formatting module 110 performing lane shift for lane matching on data output from the memory module 100 and the transposition module 120 transposing the lane shifted data.

When data is integrated and stored without consideration of lane mismatch, that is, when the data is stored without appropriate alignment or padding, there is a problem that the number of memory inputs and outputs for performing calculating or processing is excessively variable. Accordingly, the computing system 10 according to the embodiment of the present disclosure may limit the output lane of the memory and the input lane of the processor 130 to be mismatched with a certain size. In this case, the lane shift may be simply implemented to perform only lane up/down shifting. A maximum lane shift size of the formatting module 110 may vary depending on specific embodiments. In this case, data decomposition of the memory module 100 may be performed according to the limitation of a maximum size of the lane shift.

For example, for the tensor, the memory module 100 may decompose the tensor dimension so that H0 is a multiple of a convolution stride. For example, when H0 is equal to or greater than a floor (convolution kernel size/2), the formatting module 110 may be implemented so that the lane shift supports −1/0/+1. In such a lane shift, a shift range must be expanded by R times. Accordingly, in the immediately above embodiment, the formatting module 110 must be implemented to support the lane shift by −R/0/+R. A specific operation of the formatting module 110 will be described later with reference to FIG. 3.

Figure 2:
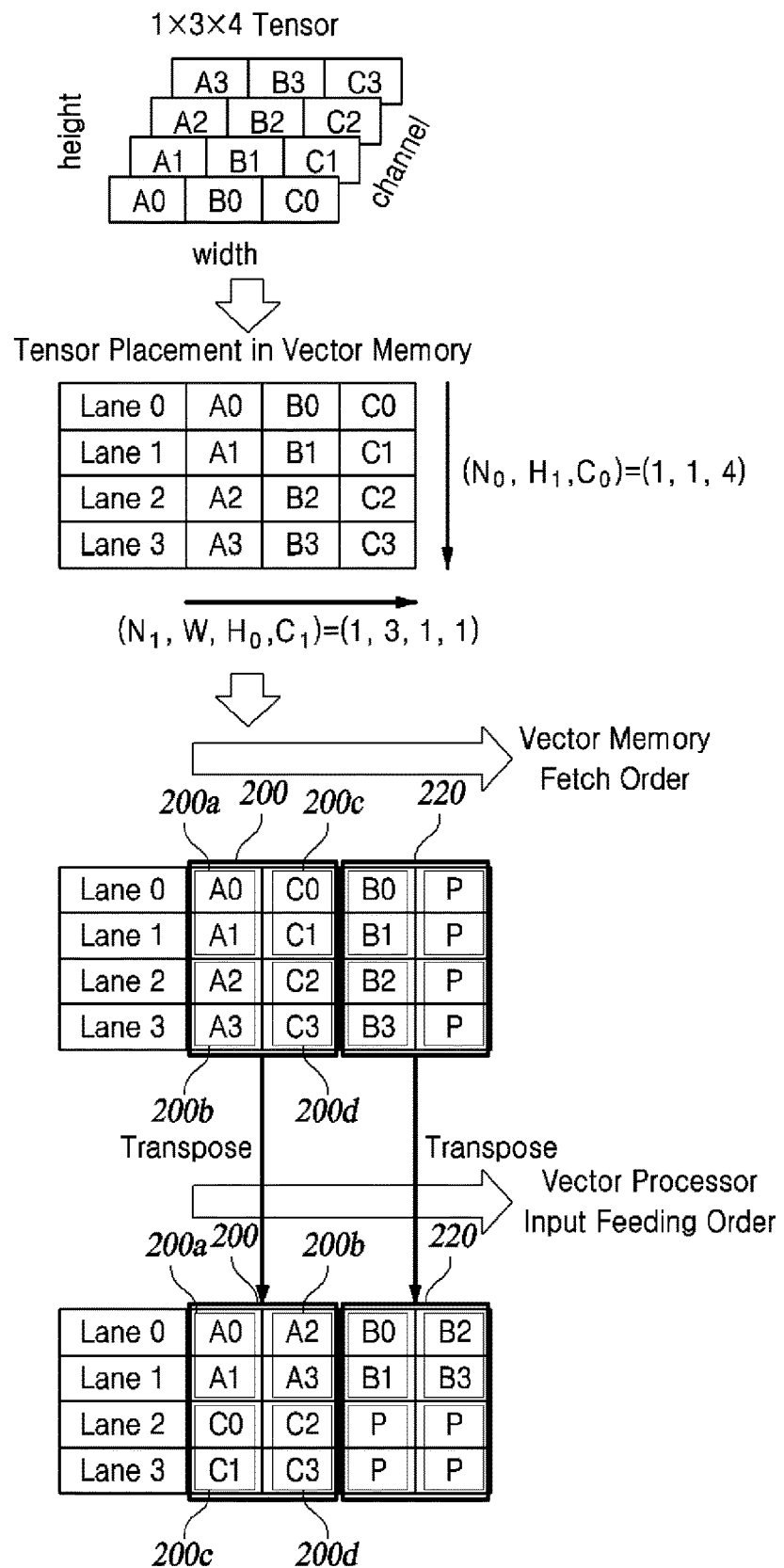
FIG. 2 is an illustrative diagram illustrating a process of providing data from a memory module to a processor according to an embodiment of the present disclosure.

FIG. 2 is an illustrative diagram illustrating a process of providing data from the memory module to the processor according to the embodiment of the present disclosure.

FIG. 2 illustrates an example of inputting (storing) a 1×3×4 tensor to the memory of the memory module 100, outputting the tensor from the memory according to a fetch order, transposing the output tensor, and inputting the tensor to the processor 130 according to an input feeding order. In FIG. 2, K=4, assuming K0=2.

In this case, since C is 4, the memory module 100 may efficiently store tensors by extending C0 to 2(=R) times K0 and storing C0 in the memory to match K. Accordingly, the memory module 100 stores elements of consecutive channels of the tensor in Lane 0 to Lane 3. Meanwhile, since K0 is half of K, which is 2, a task for converting the tensor output from the memory into an input of the processor 130 is required.

In order to calculate R bundles of a plurality of consecutive output pixels, the memory module 100 retrieves tensors in a memory fetch order with the alternate memory entries. Here, the output pixel bundle can be defined as (K/(K0*R)) output pixels that the processor 130 can process at one time. Accordingly, in the case of FIG. 2, the output pixel bundle becomes one output pixel.

The transposition module 120 transposes R pieces of data of the retrieved memory entries ((N0, H1, C0)=(1, 1, 4) in the case of FIG. 2) and supplies the data to the processor 130. The basic unit of the transposition is K0 consecutive elements (200a to 200d, or the like in FIG. 2) in the data of the retrieved memory entry, and the transposition is performed on R×R elements (200, 220, or the like in FIG. 2). Referring to a transposition result in FIG. 2, it can be seen that elements to be multiplied by the same weight among the elements required for calculation of K1 (=2) output pixels are continuously supplied to the processor 130 at the same time.

That is, the transposition module 120 may perform R×R transposition on elements in units of a memory entry so that elements to be multiplied by the same weight among elements required for calculation of the processor 130 are continuously fed.

Figure 3:
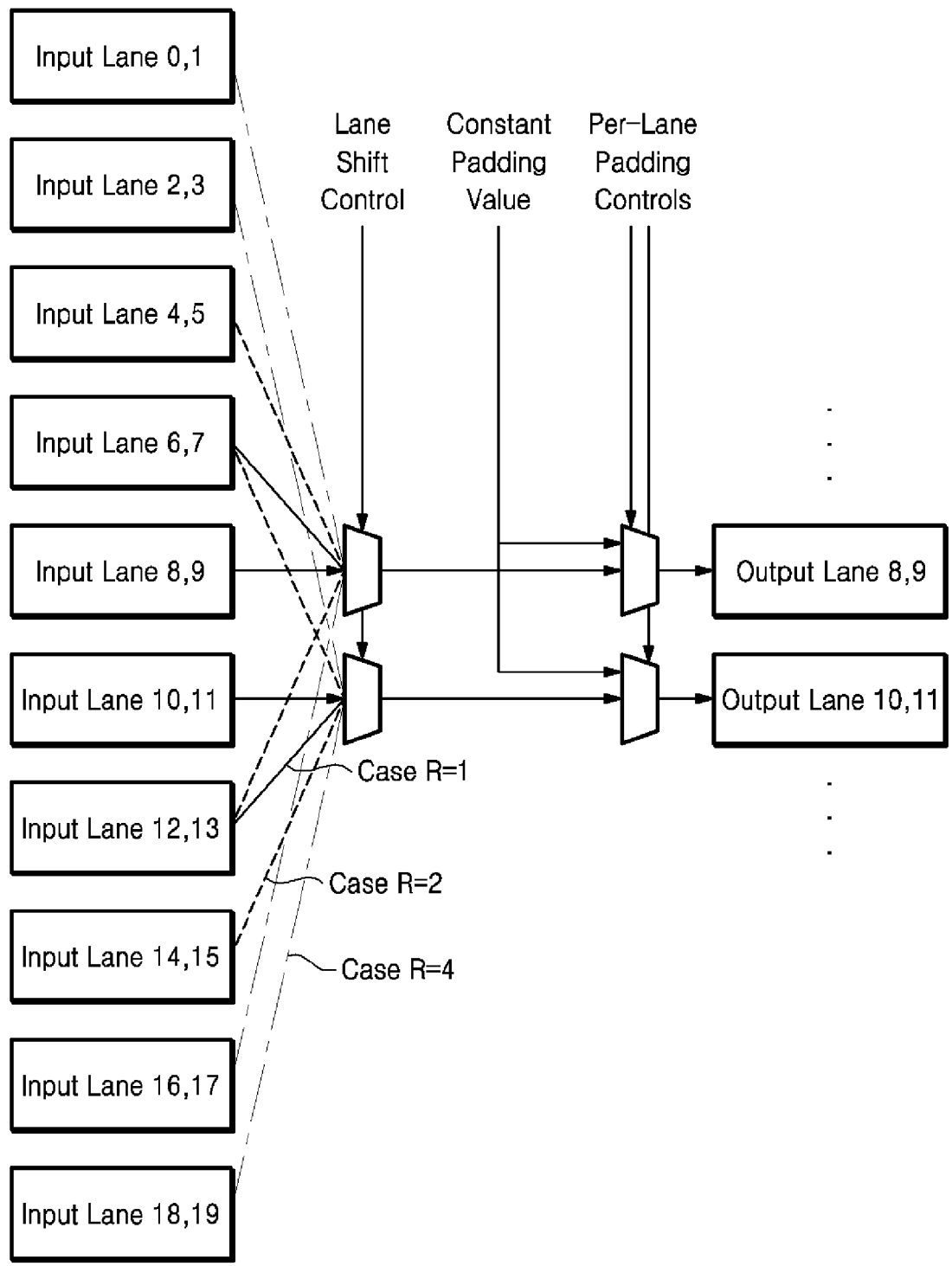
FIG. 3 is an illustrative diagram illustrating a method of implementing a formatting module according to an embodiment of the present disclosure.

FIG. 3 is an illustrative diagram illustrating a method of implementing the formatting module according to an embodiment of the present disclosure.

FIG. 3 shows an implementation example of the formatting module 110 that can support R=1, R=2, and R=4. Depending on a R value supported by the formatting module 110, a lane shift range includes all or some of −4/−2/−1/0/+1/+2/+4. Referring to FIG. 3, it can be seen that a connection of the multiplexers close to the input lane is expanded depending on the R value in order to implement the lane shift of the formatting module 110. Multiplexers close to the output lane receive a constant padding value and per-lane padding control as a padding bit and control a size and scheme of lane shift.

FIG. 3 illustrates an example of the implementation of the formatting module 110, and a circuit structure for determining expansion of the input lane or a size or direction of the lane shift may vary for each specific embodiment.

Figure 4:
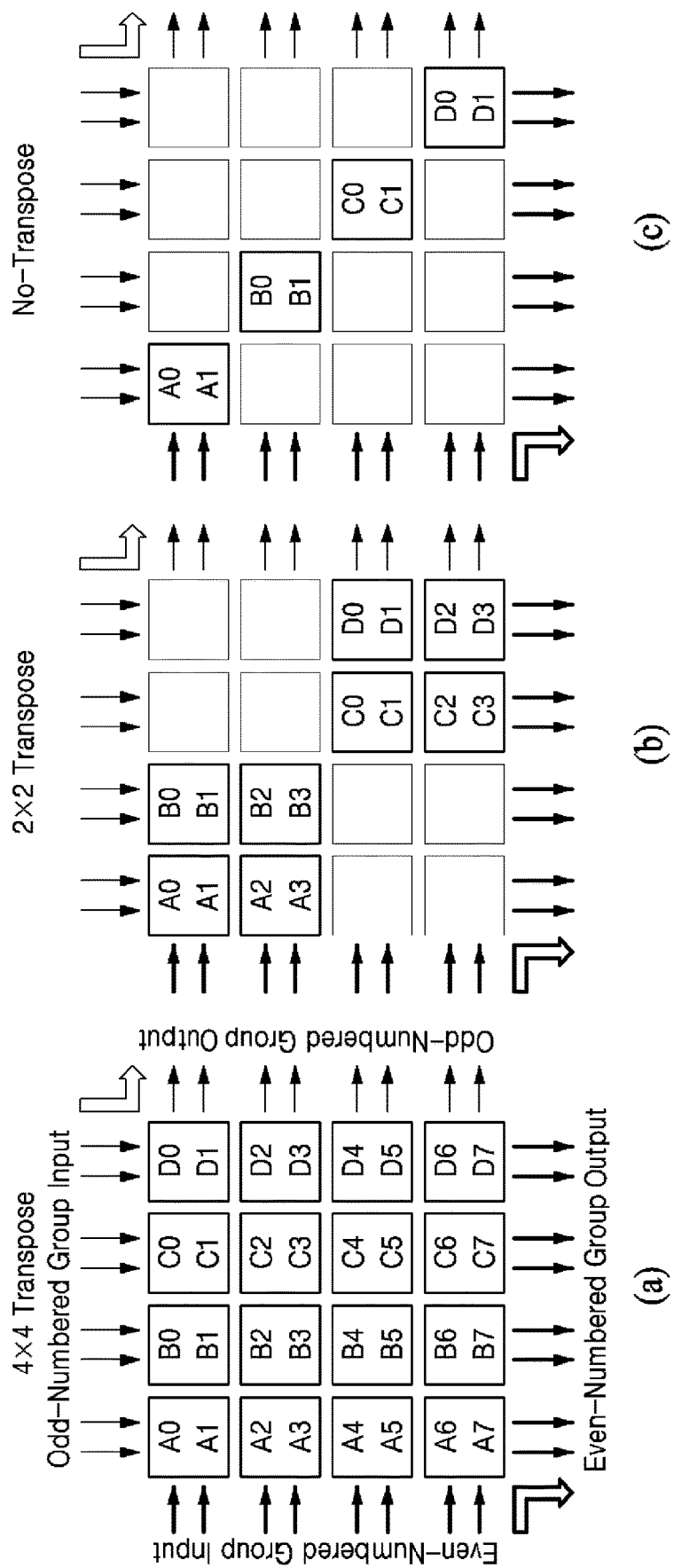
FIG. 4 is an illustrative diagram illustrating a method of implementing a transposition module according to an embodiment of the present disclosure.

FIG. 4 is an illustrative diagram illustrating a method of implementing the transposition module according to an embodiment of the present disclosure.

FIG. 4 shows the method of implementing the transposition module 120 for 4×4 transposition ((a) of FIG. 4), 2×2 transposition ((b) of FIG. 4), and 1×1 transposition, that is, when the transposition is not required ((c) of FIG. 4).

The transposition module 120 according to the embodiment of the present disclosure is implemented as a transposition circuit for Rmax, which is a maximum value of R supported by the computing system 10, and can perform transposition for all supportable R values. (a) to (c) of FIG. 4 show an example in which Rmax=4 and the transposition module 120 is implemented using a storage space that can contain a maximum of (Rmax*Rmax) element pairs.

In the embodiment of (a) to (c) of FIG. 4, inputs to the transposition circuit are data of odd-numbered memory entries and data of even-numbered memory entries, respectively. The transposition circuit may export data to the bottom, and receive the next data from the top and export the next output as soon as the input is completed. Thus, the transposition circuit can input or output consecutive data in alternate data input and output directions.

(a) of FIG. 4 shows a case where R is 4, and the transposition circuit of the transposition module 120 receives data from four alternately retrieved memory entries, exports the data four times, and performs 4×4 transposition. (b) of FIG. 4 shows a case where R is 2, and 2×2 transposition is performed using the same transposition circuit as (a) of FIG. 4. In this case, the 2×2 transposition can be performed by using only diagonal storage spaces among storage spaces of the transposition circuit divided into 2×2 units. (c) in FIG. 4 shows a case where R is 1, and in this case, the computing system 10 may be implemented so that the data output from the memory module 100 is input to the processor 130 without passing through the transposition module 120, but otherwise, data can be input or output using only the diagonal storage space among the storage spaces, as shown in (c) of FIG. 4.

The transposition module 120 may be implemented by vertically stacking the (K1/Rmax) transposition circuits.

Meanwhile, although the transposition module 120 has been described from the perspective of providing data from the memory module 100 to the processor 130 in the present disclosure, the transposition of the transposition module 120 may also be performed in a case where the data is provided from the processor 130 to the memory module 100, that is, the processed or calculated output of the processor 130 is transferred to the memory module 100. Accordingly, the basic input/output unit of the memory module 100 may be determined based on the basic output unit in which the processor 130 outputs data. The basic input/output unit may be determined to be R' times the basic output unit, and the layout of the memory entries and the memory layout may be determined accordingly. The transposition module 120 may receive R' pieces of data in basic output unit from the processor 130 and perform R'×R' transposition. A scheme of performing the transposition is the above-described scheme. For example, the transposition module 120 sequentially receives R' pieces of data from the processor 130 and performs the transposition using the basic output unit as the basic transposition unit. As described above, this transposition is performed through a process in which the transposition circuit exports data to the bottom and receives the next input from the top.

For example, decomposition of the output tensor may be further required in order to store the output tensor of the processor 130 depending on the memory layout. Accordingly, the transposition module 120 may perform R'×R' transposition on the output tensor and transfer the data to the memory module 100.

Here, the R and R' values may be different. As a result, the computing system 10 can maximize hardware efficiency by determining optimal R and R' values for each input and output for each layer of the artificial neural network.

The transposition module 120 may be implemented to include a sub-transposition module corresponding to each direction, or may be implemented using a transposition circuit implemented with a maximum value of R' corresponding to each direction as a reference.

Meanwhile, in the present disclosure, a basic unit of a numerical value is described as the number of elements included in the data, but this is for convenience of description, and the numerical value may vary depending on a data type (or size) of the element. For example, a vector processor that can input, output, and process N 8-bit tensor elements can also input, output, and process N/2 16-bit tensor elements or N/4 32-bit tensor elements.

Various implementation examples of devices, units, processes, steps, or the like described in the present specification can be realized by a digital electronic circuit, an integrated circuit, a field programmable gate arrays (FPGA), an application specific integrated circuits (ASIC), computer hardware, firmware, software, and/or a combination thereof. These various implementations may include being implemented as one or more computer programs executable on a programmable system. The programmable system includes at least one programmable processor (which may be a special purpose processor or may be a general-purpose processor) coupled to receive data and instructions from and transmit data and instructions to a storage system, at least one input device, and at least one output device. The computer programs (also known as programs, software, software applications, or code) contain instructions for a programmable processor and are stored on a "computer-readable recording medium."

The computer-readable recording medium includes any types of recording device on which data that can be read by a computer system are recordable. Examples of computer-readable recording medium include non-volatile or non-transitory media such as a ROM, CD-ROM, magnetic tape, floppy disk, memory card, hard disk, optical/magnetic disk, storage devices, and the like. The computer-readable recording medium further includes transitory media such as data transmission medium. Further, the computer-readable recording medium can be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, network equipment, a set-top box, an embedded device, a computer expansion module, a personal computer, a laptop, a personal data assistant (PDA), a cloud computing system, or a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A computing system comprising:
a memory module configured to input or output data from a memory according to a memory layout including a size of a lane corresponding to a size of decomposed data, the decomposed data being obtained from a tensor to be fed to or output from a processor and being addressed together by the memory; and
the processor,
wherein the memory layout is variably controlled based on a size of data simultaneously processed by the processor or based on a size of data simultaneously output by the processor.

2. The computing system of claim 1, wherein:
the tensor has multiple dimensions, and is decomposed along one or more of the multiple dimensions,
the size of the lane corresponds to a multiple of a basic processing unit, the basic processing unit representing a size of data located along to a specific one of the decomposed dimensions.

3. The computing system of claim 1, wherein the memory module determines the memory layout of the memory based on the size of the lane, and continuously stores consecutive elements of input data depending on the memory layout.

4. The computing system of claim 1, further comprising:
a transposition module configured to transpose input data based on consecutively located elements corresponding to the size of data simultaneously processed by the processor.

5. The computing system of claim 4, wherein the memory module determines the size of the lane to be R times a specific dimension in relation to a data, wherein a transposition module receives R pieces of input and output data, and the memory module determines the memory layout of the memory entries to perform memory input and output based on the size of the lane.

6. The computing system of claim 5, wherein the transposition module receives R element pairs from the memory module and performs R×R transposition, wherein the element pairs are alternately retrieved memory entries.

7. The computing system of claim 6, wherein
the memory module sequentially outputs data with alternate memory entries, and
the transposition module performs the Rx R transposition considering the element pairs, which correspond to the size of data simultaneously processed by the processor and are consecutively located among elements contained in the data in units of the memory entry, as a transposition unit.

8. The computing system of claim 4, wherein
the memory module determines the size of the lane to be R' times a basic output unit representing the size of data simultaneously output by the processor, and determines a layout of the memory entries to perform memory input and output based on the size of the lane, wherein R' is associated with pieces of data from processor to the memory module, and
the transposition module receives R' element pairs from the processor and performs R'×R' transposition.

9. A method of performing transposition in a device, the method comprising:
determining a size of a lane of a memory module based at least in part on a specific dimension in relation to a data type of data of the memory module; and
sequentially receiving R element pairs from the memory module or a processor, and performing R×R transposition based at least in part on consecutively located elements corresponding to the data type of the data.

* * * * *